United States Patent [19]

Dufour

[11] Patent Number: 4,773,861
[45] Date of Patent: Sep. 27, 1988

[54] MAP WITH A HOMOGENEOUS GRID SYSTEM

[75] Inventor: Henri M. Dufour, Saint Mande, France

[73] Assignee: Institut Geographique National, Paris, France

[21] Appl. No.: 26,442

[22] Filed: Mar. 16, 1987

[30] Foreign Application Priority Data

Mar. 21, 1986 [FR] France .................................. 86 04070

[51] Int. Cl.$^4$ ............................................. G09B 27/08
[52] U.S. Cl. ..................................................... 434/135
[58] Field of Search ........................ 434/130, 131, 135

[56] References Cited

U.S. PATENT DOCUMENTS 4,315,747 2/1982 McBryde ............................ 434/130

FOREIGN PATENT DOCUMENTS 2227803 11/1974 France .
1444480 7/1976 United Kingdom ................ 434/135

OTHER PUBLICATIONS

"Le Visage Nouveau Du Monde", *La Nature*, N° 3187, By L. Strohl, Nov. 22, 1950, pp. 321–340.

*Primary Examiner*—William H. Grieb
*Attorney, Agent, or Firm*—Young & Thompson

[57] ABSTRACT

A geographic map-grid network constructed on a sphere is obtained by inverse gnomonic transfer of a Romé de l'Isle polyhedron (P) circumscribed about a sphere (S) in accordance with local transfers centered at the point of tangency (E) of each lozenge-shaped face (L) of the polyhedron (P) to the sphere (S).

13 Claims, 7 Drawing Sheets

FIG_1

MAP WITH A HOMOGENEOUS GRID SYSTEM

BACKGROUND OF THE INVENTION

1. Field of the Invention

The present invention relates to a geographic map with a homogeneous grid system on a flat or curved support.

2. Description of the Prior Art

It is known that the earth, which may be assimilated in a first approximation with a sphere of radius R, is normally represented in plane images in accordance with a considerable number of methods derived from formulations of the general type:

$XP = f(l,L)$
$YP = g(l,L)$ where XP and YP are the plane coordinates, l is the longitude and L is the latitude.

In order to facilitate map plotting and referencing, a sphere grid network is also superimposed on the map. The grid system or network in most common use corresponds to lines of constant longitude and of constant latitude (meridians, parallels) which make it possible to obtain coordinates usually designated as the geographic coordinates.

Depending on the nature of the functions (f, g), it is possible to have representations (commonly but erroneously designated as projections) which are either conformal (preservation of infinitesimal angles), equivalent (preservation of areas) or aphylactic (in which neither angles nor areas are retained).

For the purpose of map coverage of a region having a small area, it is a customary practice to define a single projection in which there are sometimes formed a number of connectable interruptions or breaks, the complete assembly being intended to constitute a continuous representation (without either duplication or tearing) of the zone to be represented.

It is possible to construct a single projection for the whole world but in this case certain portions are inadequately represented: in particular, a single conformal projection cannot represent the entire world without singularity.

In the case of large areas and all the more so in the case of the whole world, it is a common practice to construct a projective system or in other words a family of projections (in which the functions (f, g) differ only in respect of numerical coefficients), which cover the region to be represented but with lines on which the interruptions or breaks of two adjacent projections do not fit together.

The centers of the projections are adjusted by virtue of considerations which are very different but are often determined as a function of the geographic coordinates.

Among the representations, conformal projections are in very wide use since they represent the terrain in a similitude of ratio K (scale) which, as a general rule, is stationary on a central element (line or point) and increases parabolically as the distance from said central element is greater.

Plotting in a geographic coordinate system (meridians, parallels) is fairly satisfactory locally, (in particular at the equator) but becomes singular in the polar regions. The meridians in fact converge in the polar regions and the longitude becomes indeterminate. Furthermore, the areas delimited by meridians and parallels are relatively rectangular in the vicinity of the equator and become triangular in the vicinity of the poles, with the result that the subdivisions correspond to elements having very variable areas or else to elements having very different shapes if the procedure adopted consists in regrouping.

It has already been sought to establish on the terrestrial sphere grid systems forming substantially equal areas, these areas being intended to permit subdivision into grid meshes having areas which are in turn substantially equal irrespective of the part of the globe considered.

Among the methods proposed up to the present time, the method which offers the highest degree of fineness appears to have been given by Popko (1968) (ref.: G. H. Dutton: Geodesic modeling of planetary relief—Cartographica—Auto Carto Six—Selected papers—Volume 21/Numbers 2 and 3; Sixth International Symposium on Automated Cartography Ottawa—Hull, October 16-21, 1983. University of Toronto Press—1984; pages 192-193) which has proposed, among others, the subdivision of a grid system of sixty equal spherical isosceles triangles obtained for example by gnomonic transfer to the sphere of the edges of the semiregular polyhedron of the second type which is circumscribed about the sphere and has sixty equal triangular faces.

Starting from the initial grid system, it is proposed to subdivide each triangle into four spherical triangles by joining the midpoints of the sides by three great-circle arcs, whereupon each triangle can subsequently be iteratively subdivided in accordance with the same method. However, in each subdivision, the area of the central triangle is larger than the area of the end triangles. Furthermore, the method is not very simple from a numerical standpoint.

SUMMARY OF THE INVENTION

One object of the present invention is to construct a grid system on the sphere for a cartographic application in which the areas of the grid meshes are as close in value as possible irrespective of the degree of subdivision while also having shapes which are very similar to each other.

In accordance with the invention, the distinctive feature of the geographic map lies in hhe fact that it has a grid system obtained by inverse gnomonic transfer of a Romé de l'Isle polyhedron circumscribed about the sphere in accordance with local transfers centered at the points of tangency of each lozenge-shaped face of the polyhedron to the sphere.

It is recalled in this connection that the Romé de l'Isle polyhedron is a semi-regular polyhedron having thirty equal faces of lozenge shape in which the vertices located at the ends of the major diagonals of the lozenges correspond to the vertices of the icosahedron and in which the vertices located at the ends of the minor diagonals of the lozenges are projected to the centers of the faces of the icosahedron. Thus the local transfer of each lozenge centered at the point of tangency to the sphere makes it possible to obtain on said sphere an initial grid system of strictly identical spherical lozenges.

In an advantageous embodiment of the invention, each lozenge is subdivided into elementary quadrilaterals by iterative dichotomy of each side by straight lines parallel to the adjacent sides. Thus, in the polyhedron, the elementary quadrilaterals are identical lozenges and their transfer to the sphere in an inverse gnomonic projection makes it possible to obtain spherical quadrilaterals of similar shapes by means of an extremely simple numerical method.

According to a preferred aspect of the invention, the lozenges of the Romé de l'Isle polyhedron are subdivided into elementary quadrilaterals, the vertices of which are defined by straight lines, the intersections of said straight lines with the sides of the lozenge being determined by formulae of the polynomial type. Spherical quadrilaterals having areas extremely close in value are thus obtained on the sphere.

In a preferred embodiment of the invention, each elementary quadrilateral is re-cut into pseudotriangles by arcs which are substantially parallel to the minor diagonal of the lozenge and pass through the vertices of the elementary quadrilaterals. Even finer subdivision is thus obtained while preserving grid meshes having extremely similar shapes and areas.

According to a further aspect of the invention, a geographic map is designed with a grid system derived from the sphere network defined earlier. In accordance with a distinctive feature, the map grid system is obtained from said sphere network by a projection of part of said network. There is thus obtained on the map a grid system which is of regular shape irrespective of the point of the globe which serves as the center of the map.

In an advantageous embodiment of the aforementioned aspect of the invention in conjunction with a sphere network in the form of pseudo-triangles, it is possible to construct a projective system of simple but redundant design by associating with each node of the grid system the map which is centered at said node and covers at least the polygon (hexagon or pentagon) formed by the pseudo-triangles, one of the vertices of which is constituted by the node aforesaid: this is the principle of ternary cartography. It will be possible in practice to achieve an appreciable reduction in the number of maps to be prepared by making a choice between these maps which can be broken down into three categories. One category corresponds to total coverage of the sphere without any overlapping of polygons and includes the twelve regular pentagons centered at the vertices of the major diagonal of the spherical lozenges: this is the principal coverage which will be carried out preferentially. The other two categories (known as secondary coverages) each correspond to one total coverage of the sphere but with a few lines of overlap of the constituent polygons. They are formed solely of hexagons and include the hexagons cettered at the vertices of the minor diagonal of the fundamental spherical lozenges.

DESCRIPTION OF THE PREFERRED EMBODIMENTS

Figure 1:
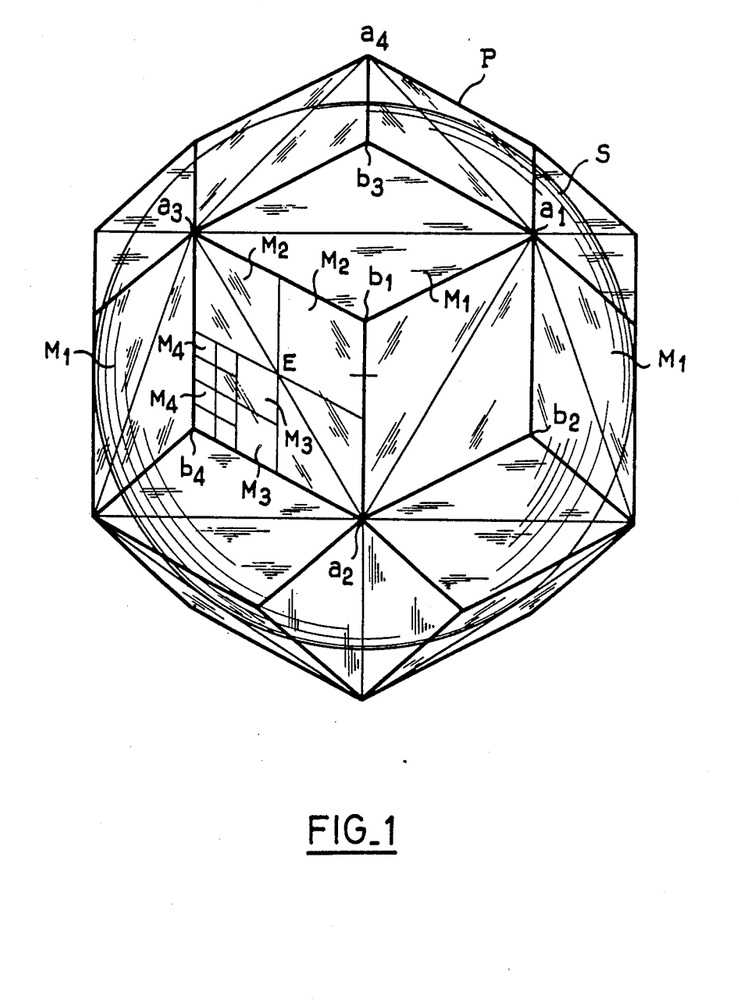
FIG. 1 is a front view of a Romé de l'Isle polyhedron circumscribed about a sphere.

With reference to FIG. 1 and when consideration is given to a Romé de l'Isle polyhedron P or in other words to a semi-regular polyhedron of the second type having thirty identical lozenge-shaped faces and circumscribed about the sphere S with which the earth can be assimilated, each face of the polyhedron is tangent to the sphere at the center E of the lozenge which delimits each face or else at the point of intersection of the diagonals of the lozenge formed by each face.

In accordance with the invention, a local transfer is made from the central point E of each face of the Romé de l'Isle polyhedron. In other words, each point of the contour of one face is transferred to the sphere along a radial line extending from the point considered to the center of the sphere, the point of transfer to the sphere being the point of intersection ofssaid radial line with the surface of the sphere.

Figure 3:
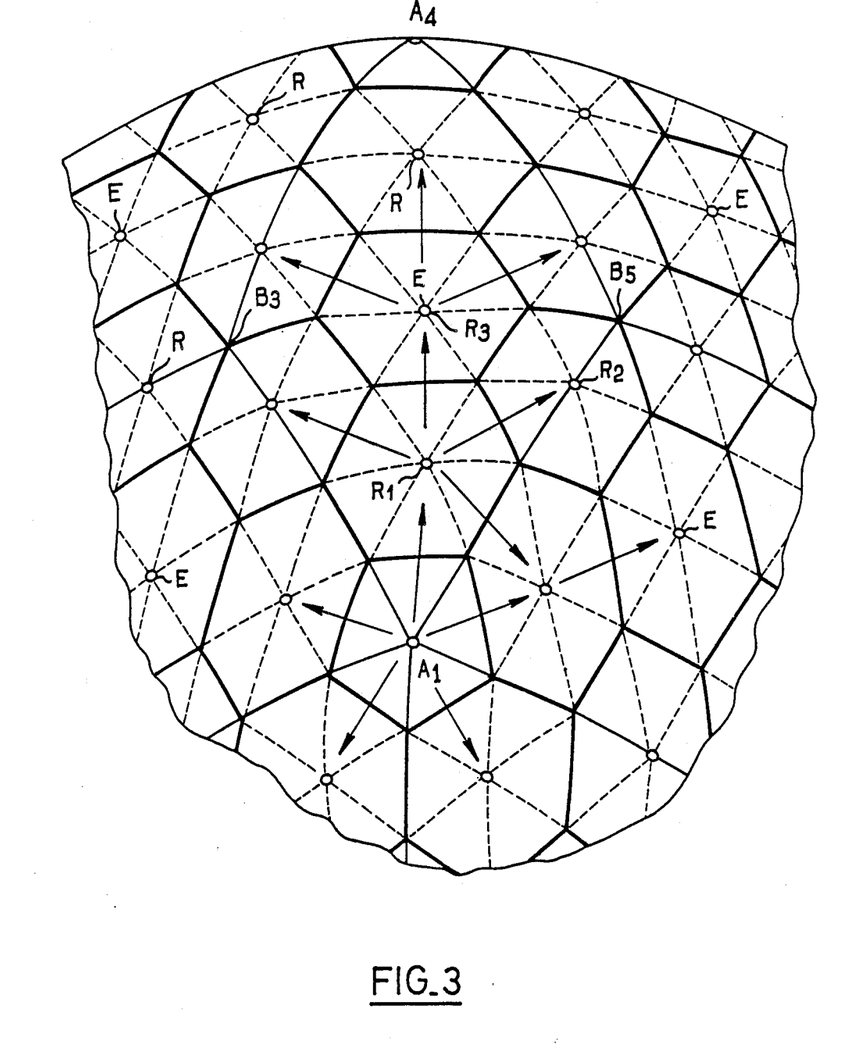
FIG. 3 is a schematic perspective view of a portion of sphere covered with the grid system in accordance with the invention.

If the references $a_1, a_2, a_3, \ldots a_{12}$ designate the vertices at the ends of the major diagonals of the faces of the Romé de l'Isle polyhedron (which correspond to the twelve vertices of the icosahedron which is associated with said polyhedron, the icosahedron associated with the polyhedron being represented by a thin line in FIG. 1) and if the references $b_1, b_2, b_3, \ldots b_{20}$ designate the vertices at the ends of the minor diagonals of the faces of the Romé de l'Isle polyhedron (which are projected to the centers of the faces of the associated icosahedron) spherical lozenges are thus obtained on the sphere and have vertices which are located respectively at the points $A_1, A_2, \ldots A_{12}$ and $B_1, B_2, \ldots B_{20}$ (as shown in FIG. 3).

It is observed that the thirty spherical lozenges obtained on the sphere are strictly identical from the point of view of both shape and size, only the orientation of these lozenges being variable.

The initial grid system which has just been described will serve as a basis for subdivisions into more or less numerous elementary grid meshes as a function of the scale of the cartographic documents to be compiled or else as a function of a desired density of plotting on the sphere.

Provision is made in accordance with the invention for a first mode of partition which consists in subdividing each lozenge into elementary quadrilaterals by iterative dichotomy of each side by straight lines which are parallel to the adjacent sides. Thus, at the time of each dichotomy of the sides, the starting lozenge is divided into four strictly identical lozenges which, at the time of a transfer by inverse gnomonic projection having a center E, produce spherical quadrilaterals of similar shapes on the sphere. The reference $M_1$ will be used hereinafter to designate the initial network of thirty lozenges, the reference $M_2$ will designate the network obtained by re-cutting each side of the lozenge in two or in other words by producing four elementary quadrilaterals, the reference $M_3$ will designate the network which is obtained by again subdividing the preceding network by dichotomy of the sides or in other words which is made up of sixteen elementary quadrilaterals in the initial lozenge, and so on until the network obtained and designated by the reference $M_n$ corresponds to partition of each side of the initial lozenge into $2^{n-1}$ or in other words is made up of $2^{2n-2}$ elementary quadrilaterals in an initial lozenge. FIG. 1 illustrates a plurality of lozenges in accordance with the network system $M_1$ and a lozenge which is partially divided so as to form the networks $M_2$, $M_3$ and $M_4$.

It is worthy of note that the initial network and the subdivided network which has just been described are transferred to the sphere along great-circle arcs and it is therefore particularly easy to draw an arc from two points.

Figure 2:
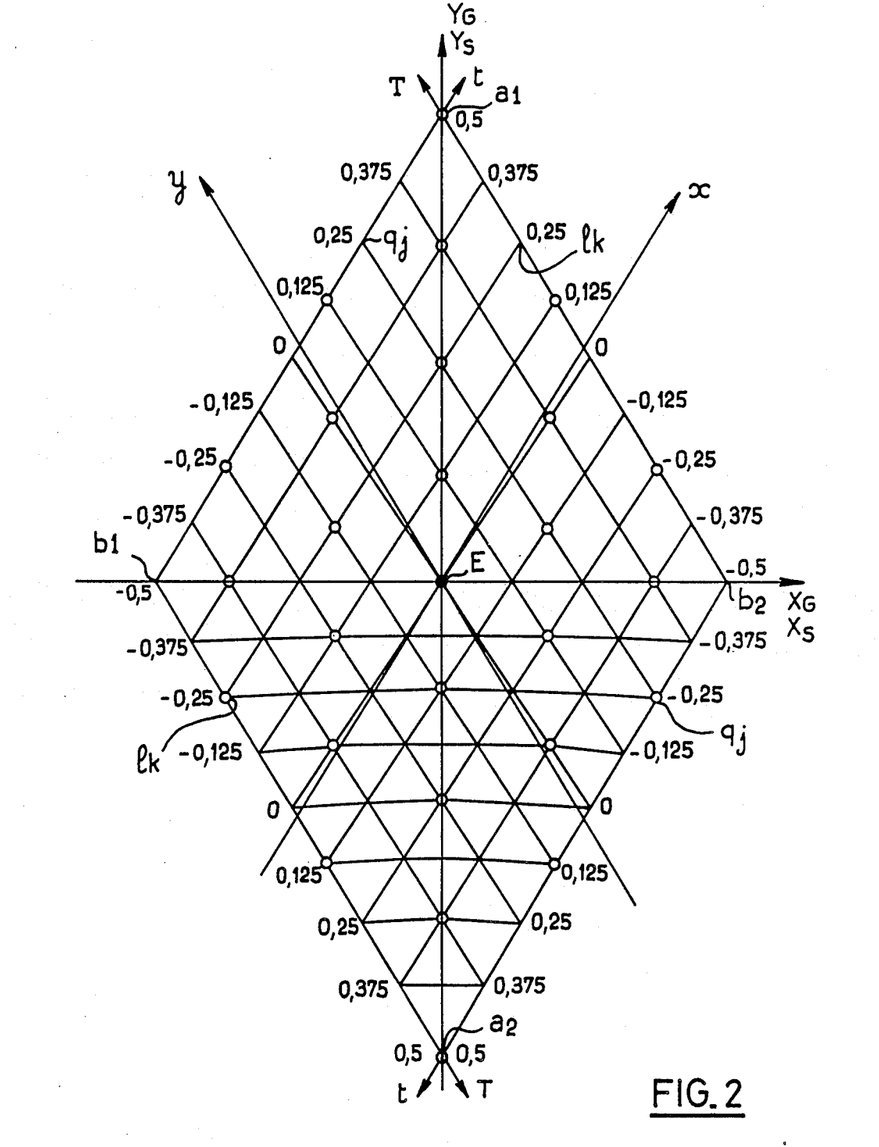
FIG. 2 is a plan view of one face of the Romé de l'Isle plyhedron with a polynomial subdivision in accordance with the invention.

The breakdown described in the foregoing constitutes a primary approach to the problem and can be used in certain cases on account of its very great numerical simplicity. At the time of transfer by gnomonic projection having a center E, however, it is apparent that the elementary quadrilaterals are more or less deformed as a function of the distance between said quadrilaterals and the point of tangency E of the face of the polyhedron. It has therefore been endeavored to find a method of subdivision which makes it possible to obtain much more strictly similar areas on the sphere. It is therefore proposed in accordance with the invention to subdivide each lozenge into elementary quadrilaterals, the vertices of which are defined by straight lines, the intersections of said straight lines with the sides of the lozenge being determined by polynomial formulae. In particular, in a first embodiment illustrated in FIG. 2, the intersections $(l_k, q_j)$ with the sides of the lozenge are determined by the following formulae:

$$a_2 l_k = 1 - g(-T) \quad (1)$$

$$b_2 l_k = g(T) \quad (2)$$

$$a_2 q_j = 1 - g(-t) \quad (3)$$

$$b_1 q_j = g(t) \quad (4)$$

where
$a_2$ is a vertex at one end of the major diagonal of the lozenge;
$b_1$ and $b_2$ are the vertices at the ends of the minor diagonal of the lozenge;

$$g(T) = 0.5 + T + (T^2 - 0.25)(v_o + v_1 T + v_2 T^2 + v_3 T^3) \quad (5)$$

$$g(t) = 0.5 + t + (t^2 - 0.25)(v_o + v_1 t + v_2 t^2 + v_3 t^3) \quad (6)$$

$v_o = 0.07215444$
$v_1 = 0.229157$
$v_2 = 0.026875$
$v_3 = 0.080845$
T being of the form $T = k/NL - 0.5$
t being of the form $t = j/NL - 0.5$
where
NL is the whole number of subdivisions sought for one side;
j and k are whole numbers which vary from 1 to NL; $a_2 l_k$, $b_2 l_k$, $a_2 q_j$, $b_1 q_j$ being the fractions of the length of side of the lozenge which are transferred to the sides of the lozenge respectively from the vertices $a_2$, $b_2$, $a_2$, $b_1$.

The network obtained in a binary subdivision defined by $NL = 2^{n-1}$ will be designated as before by the reference $M_n$.

It has been found by experiment that, with this type of subdivision of the faces of a Romé de l'Isle polyhedron prior to transfer of said faces to the sphere, the lines of partition on the sphere continue to be great-circle arcs and the ratio between the area of the largest elementary spherical quadrilateral and the area of the smallest elementary spherical quadrilateral remains smaller than 1.01.

In another mode of subdivision which is even more accurate but in which the separating lines on the sphere are no longer great-circle arcs, functions of T and t are added to the polynomials g(T) and g(t), thus introducing a small correlation between these two parameters. It is thus possible to produce equal areas at any level of subdivision. Nevertheless, it is preferred in practical applications to adopt a formulation which remains simple. By way of example, g(T) and g(t) become respectively:

$$h(T, t) = g(T) + uT(T^2 - 0.25)(t^2 - 0.25) \quad (7)$$

$$h(t, T) = g(t) + ut(T^2 - 0.25)(t^2 - 0.25) \quad (8)$$

with
$v_o = 0.07215444$
$v_1 = 0.222360$
$v_2 = 0.026089$
$v_3 = 0.085626$
$u = -0.049765$ T and t retain the same meaning as before. The ratio of the largest area of the spherical quadrilateral to the smallest area in respect of any given partition or subdivision given by NL remains smaller than 1.001.

In order to plot a point on the grid system thus formed, graduations having values T and t and extending successively from $-0.5$ at the points $b_1$ or $b_2$ to $\pm 0.5$ at the points $a_1$ or $a_2$ are marked on the sides of the lozenge at the points of intersection $(l_k, q_j)$ of the subdivision lines with the sides of the lozenge. This graduated scale is repeated identically on the sixty edges of the Romé de l'Isle polyhedron and can be reproduced on any spherical or cartographic image of these edges. However, it should be noted that, in order to produce a predetermined separating line (T=0.375, for example) in a lozenge, it is necessary to connect two opposite graduation points (T=0.375 on $b_2 a_1$ and T=$-0.375$ on $b_1 a_2$). For reasons of a practical order, it will be found necessary within each lozenge to substitute for the graduated scale of values (T,t) a graduated scale which is better suited to this lozenge. In practice, a division into (NL×NL) quadrilaterals will produce a number sequence related to k (from 0 to NL) on the respective sides $a_2 b_1$, $b_2 a_1$ and will produce a number sequence related to j from 0 to NL on the respective sides $b_1 a_1$, $a_2 b_2$.

Finally, it will be possible to replace one of these graduated scales by an alphabetical coding sequence. Thus a subdivision into sixty-four quadrilaterals (corresponding to three dichotomies of the sides) can be designated by the cartesian product $$(A,B,C,D,E,F,G,H,I) \times (0,1,2,3,4,5,6,7,8)$$

assigned to its eighty-one vertices.

Any subdivision into pseudo-lozenge quadrilaterals (numbering NL×NL) results in the possibility of an associated subdivision in triangles (in twice the number). This result is obtained by re-cutting each quadrilateral into two triangles having very similar areas by an arc which is substantially parallel to the minor diagonal of the initial lozenge and joins two adjacent quadrilateral vertices.

The network or grid system obtained is illustrated in the lower half of FIG. 2.

Numerically, the equation of each continuous line of separating arcs is very simple:

T+t = constant

The separating arc is slightly convex towards the lozenge diagonal which is in turn a great-circle arc.

It is apparent from the lower half of FIG. 2 that the same division into triangles is obtained by subdividing each of the two initial triangles of the type $b_1b_2a_2$ into four triangles defined by three lines T=constant, t=constant and T+t=constant which pass approximately through the midpoint of the sides of the starting triangle, each triangle obtained being resubdivided in accordance with the same method.

There is thus obtained a hierarchized breakdown into triangles of the sphere, starting from sixty equal fundamental triangles, each of which can be subdivided indefinitely in a system of base 4.

This possibility can be extremely valuable in a very wide range of applications, (particularly in statistical evaluations at the surface of the earth).

In order to recall the non-spherical character of the triangles defined in the foregoing, they will hereinafter be designated as pseudo-triangles.

According to the second aspect of the invention, a geographic map is prepared with a grid system derived from the network of the sphere which has just been described by constructing a projection of a portion of the sphere network corresponding to the desired map and preferably a radial projection centered at one point of the network, in particular a stereographic projection.

By way of example, it is proposed to position the sphere network described in the foregoing with respect to the earth by coinciding the transfer of one vertex of the Romé de l'Isle polyhedron located at the end of a major diagonal of a lozenge with the north pole. The point of transfer of the opposite vertex accordingly coincides with the suth pole and the different points of transfer of the vertices of the Romé de l'Isle polyhedron which correspond to the vertices of the associated icosahedron are arranged in accordance with the following table:

|  | Longitude | Latitude |
| --- | --- | --- |
| South pole |  | −90° |
| North pole |  | +90° |
| South Pacific | −144° | −26°.5651 |
| North America | −108° | +26°.5651 |
| South America | −72° | −26°.5651 |
| North Atlantic | −36° | +26°.5651 |
| South Atlantic | 0° | −26°.5651 |
| Middle East | +36° | +26°.5651 |
| Indian Ocean | +72° | −26°.5651 |
| Far East | +108° | +26°.5651 |
| Australia | +144° | −26°.5651 |
| North Pacific | +180° | +26°.5651 |

On the basis of this working hypothesis, the positions of the other distinctive points of the system are noted:

Image points of the vertices b of the lozenges: 5 points at each of the latitudes ±52°.6226; ±10°.8123; Center points E of the lozenges: 10 equatorial points, 5 points at each of the latitudes ±58°.2825; ±31°.7175.

Figure 4:
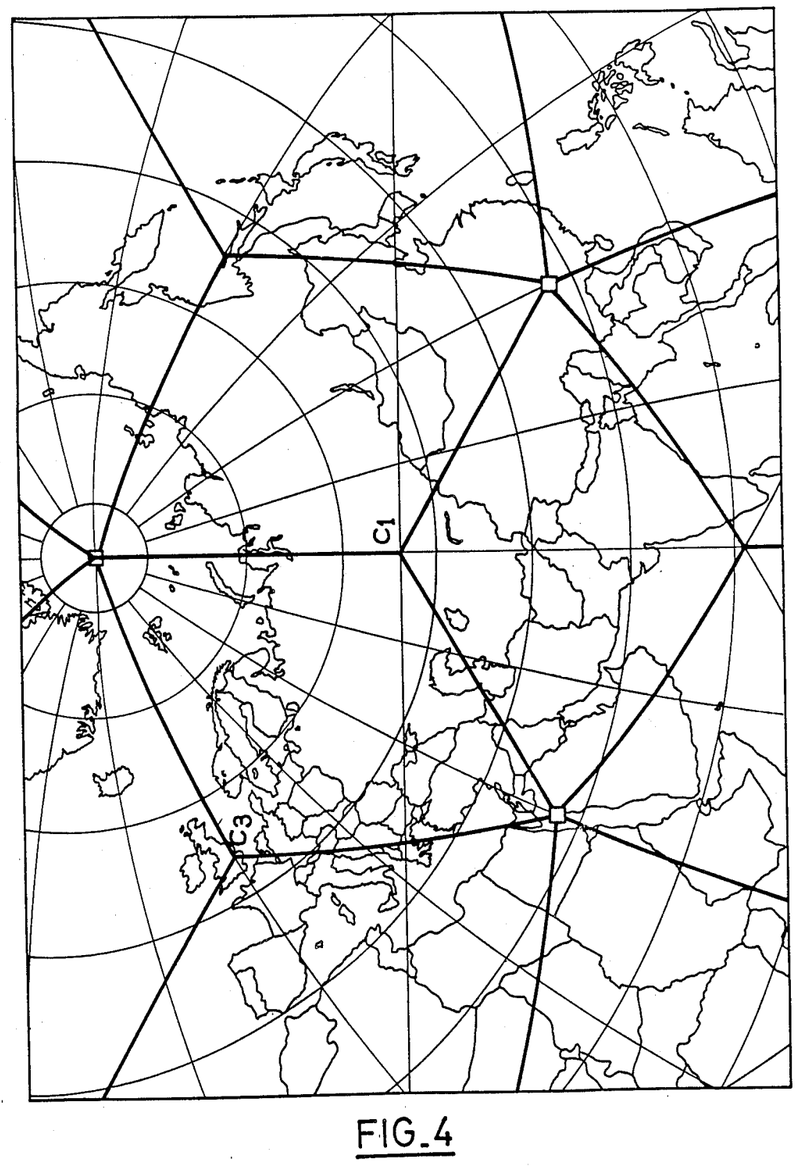
FIG. 4 shows one example of construction of a map in accordance with the invention.
Figure 5:
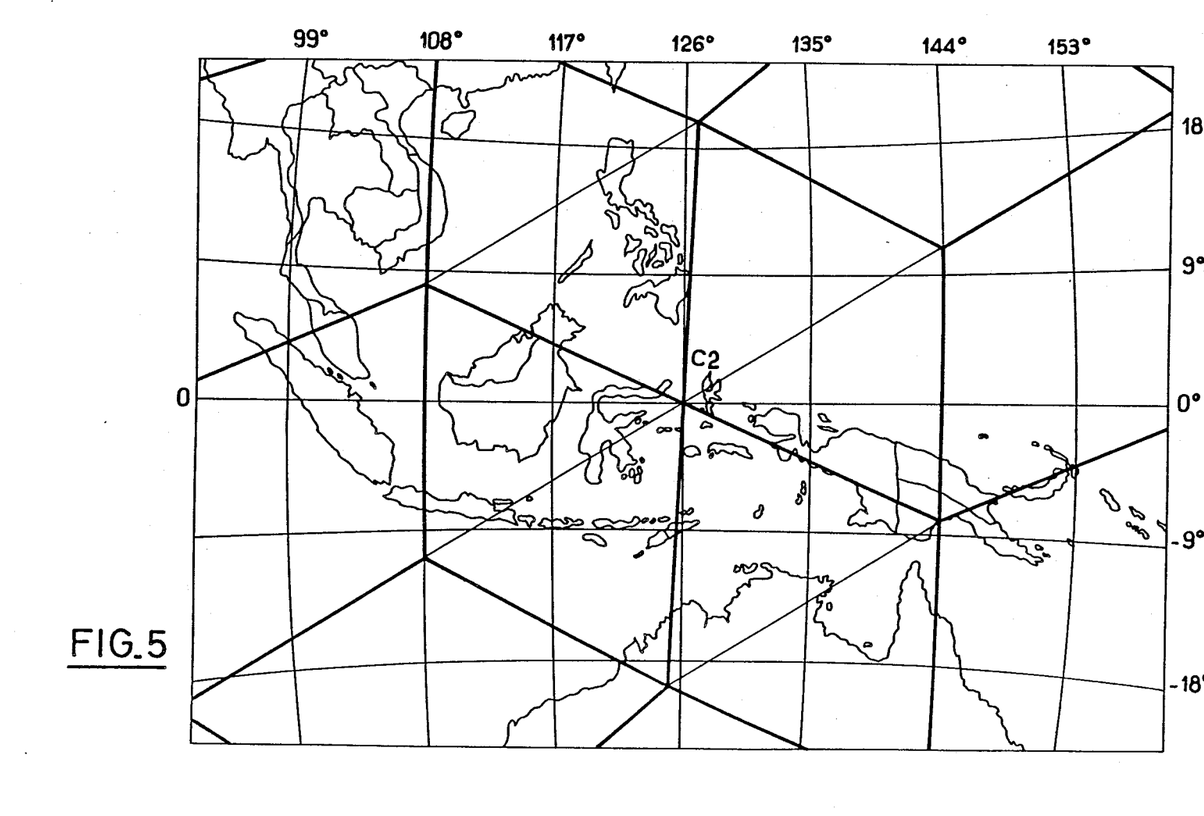
FIG. 5 is a double-scale map forming part of the principal coverage and centered on the equator.
Figure 6:
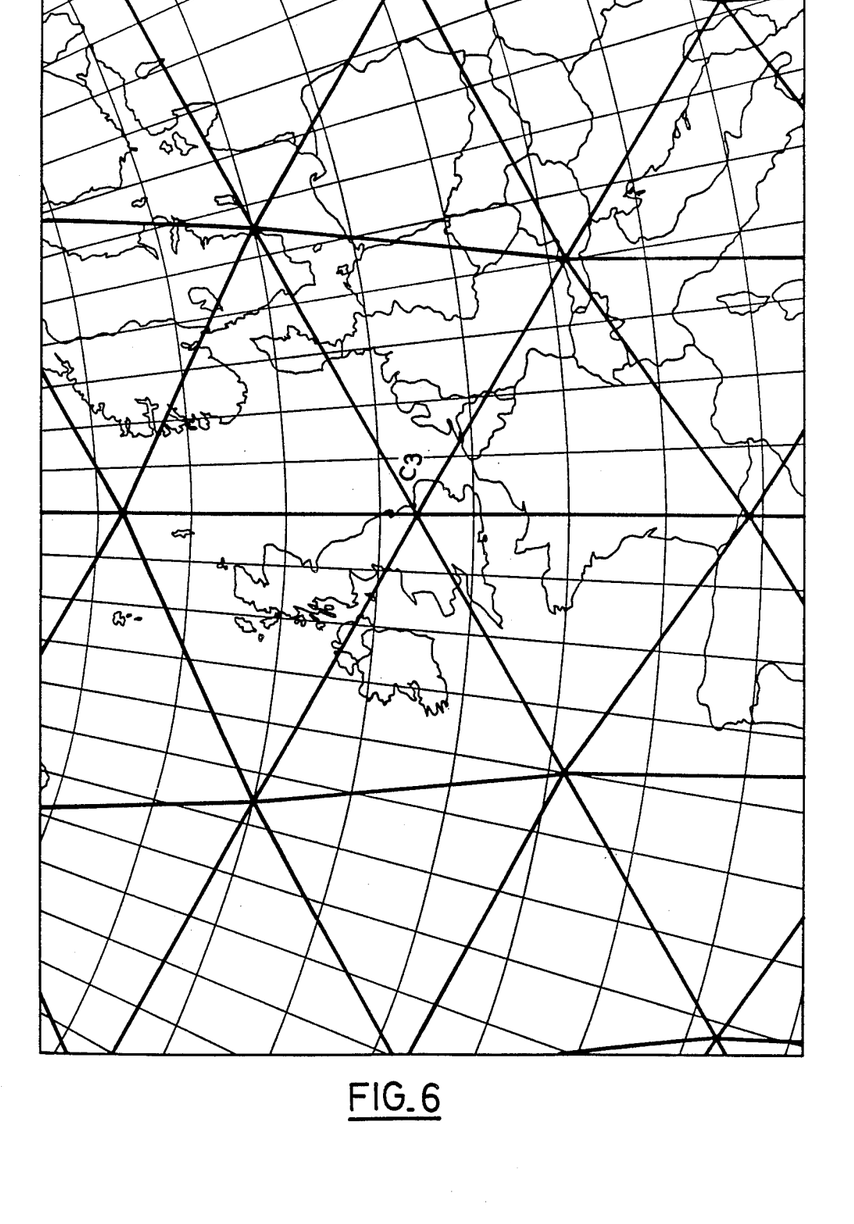
FIG. 6 shows an example of construction of a quadruple-scale map which is included in the map of FIG. 4.

When the grid system is thus positioned with respect to the earth (globe), FIG. 4 illustrates the map obtained by means of a stereographic projection centered at the point $C_1$, the map being provided with a grid system of the type designated as $M_1$. FIG. 5 is a doublescale map which is centered in this case at $C_2$ and provided with a grid system of type $M_2$, this system being re-cut partially into pseudo-triangles. FIG. 6 is drawn to a scale which is double that of FIG. 5 and centered at $C_3$, the grid system of this map being of type $M_3$ and also re-cut into pseudo-triangles. (The points $C_1$ and $C_3$ are at a latitude of 52°.6226; the point $C_2$ is a lozenge center located on the equator at longitude equal to 126°).

When compiling a gnomonic map centered at a point E which is the center of a lozenge (as shown in FIG. 5), the coordinates (x, y) of any point of the map along oblique axes Ex, Ey which have their origin at the point E and extend in a direction parallel to the sides of the lozenge (as shown in FIG. 2) can be readily obtained from the cooddinates (T, t) of the same point by solving the following equations (valid on the sphere of radius 0.5):

$$y - 2x\ P(T) = I(T) \qquad (9)$$

$$-2y\ P(t) + x = I(t) \qquad (10)$$

with $$P(T) = (v_o + v_2 T^2)(T^2 - 0.25) \qquad (11)$$

$$P(t) = (v_o + v_2 t^2)(t^2 - 0.25) \qquad (12)$$

$$I(T) = 0.36327126[T + (v_1 T + v_3 T^3)(T^2 - 0.25)] \qquad (13)$$

$$I(t) = 0.36327126[t + (v_1 t + v_3 t^3)(t^2 - 0.25)] \qquad (14)$$

where $v_o$, $v_1$, $v_2$, $v_3$ are the same coefficients as in the case of formulae (5) and (6).

It is observed that these equations are very straightforward and in particular that they do not contain any trigonometric formula, with the result that they can be solved very rapidly, which is essential in data processing applications.

Similarly, the gnomonic coordinates (XG, YG) in a reference frame which has its origin at the point E and the axes of which are oriented respectively along the minor diagonal and the major diagonal of the lozenge (FIG. 2) are given by the following equations:

$$-XG \cos \frac{c}{2} [1 + 2P(T)] + YG \sin \frac{c}{2} [1 - 2P(T)] = I(T) \operatorname{sinc} \qquad (15)$$

$$XG \cos \frac{c}{2} [1 + 2P(t)] + YG \sin \frac{c}{2} [1 - 2P(t)] = I(t) \operatorname{sinc} \qquad (16)$$

where c is the angle at the center corresponding to one side of the isocahedron and consequently has the value c=63°4349488.

These equations are the equations of two straight lines and consequently involve a transition from the coordinates (T, t) to the gnomonic coordinates (XG, YG) through the intersection of two straight lines.

Similarly, there is a transition from the coordinates (T, t) to the stereographic coordinates (XS, YS) in a reference frame which is centered at E and directed along the diagonals of the lozenge by means of the following formulae:

$$A(T)(XS^2 + YS^2) - XS \cos \frac{c}{2} [1 + 2P(T)] + \qquad (17)$$

$$YS \sin \frac{c}{2} [1 - 2P(T)] = F(T)$$

$$A(t)(XS^2 + YS^2) + XS \cos \frac{c}{2} [1 + 2P(t)] + \qquad (18)$$

-continued $$YS \sin \frac{c}{2} [1 - 2P(t)] = F(t)$$

$$A(T) = F(T) = I(T) \sin c; A(t) = F(t) = I(t) \sin c$$

Equations (17) and (18) are the equations of two circles and therefore involve a transition from the coordinates (T, t) to the coordinates (XS, YS) through the intersection of two circles.

The adoption of the most accurate formulae would be implemented by adding polynomial corrective terms with two variables (T, t) to the second expressions of equations (9), (10) and (15) to (18) and would entail calculations which are slightly longer but of the same nature.

It is also pointed out that a formulation without any correlation between the variables (T, t) can be obtained from the formulae (17) and (18). Postulating that $A(T) \neq F(T)$, $A(t) \neq F(t)$, there are thus obtained equations in stereographic projection of circles which are no longer images of great circles of the sphere but small circles of this surface. The intersection of these circles as modulated by the parameters (T, t) makes it possible by suitably selecting the coefficients of the formulae to construct a grid system based on circles on the sphere and in stereographic projection. This grid system in fact bears a very close resemblance to the system defined on the basis of the gnomonic projection in the case referred-to as the most accurate working hypothesis.

In all cases, the ratio r between the area of an elementary figure of the sphere and the area of its image in the corresponding plane (T, t) is a function which is easy to calculate, which is continuous over the entire sphere and which can in addition be derived within each of the thirty fundamental lozenges. Making allowance for a constant factor, the value which has been adopted for this ratio is 1.003000 at the point E, 1.005000 at the vertices of the lozenge, and 0.995161 at the midpoints of the sides (formulae (5) and (6)). In the most accurate modes (in which the separating lines are no longer great-circle lines), it has been possible to adopt a value $r = 1.000000$ at each of the points which have just been mentioned.

The properties established in the reference frames centered at E are generally applicable to other origins. Thus the formulae of transition between gnomonic reference frames are homographic formulae of real variables which preserve the straight lines. The formulae of transition between stereographic reference frames are homographic formulae of complex variables which preserve the circles.

The transition of coordinates of the type (XG, YG) to geographic coordinates [L] is produced by means of the terrestrial cartesian coordinates [U, V, W]; a transition from [XG; YG; 0.5] to [U, V, W] accordingly takes place by means of a three-dimensional rotation followed by a homothetic correspondence on the result vector in order to bring this latter back to the length R. The values (l, L) are then found by inversion of the formulae:

$$U = R \cos L \cos l; V = R \cos L \sin l; W = R \sin L$$

In the foregoing developments, consideration has been given to axes directed along the diagonals of the lozenge. It is known, however, that in a Romé de l'Isle polyhedron, the lozenges are oriented in different directions. In order to facilitate reading of maps and to ensure homogeneous orientation of these latter, it is proposed in accordance with the invention to carry out regrouping of the pseudo-triangles obtained by subdivision of the elementary quadrilaterals in the form of polygons centered at a vertex which is common to a number of pseudo-triangles.

FIG. 3 illustrates one way in which the pseudo-triangles can be regrouped in a grid system of the type designated as $M_3$. The initial regrouping centers are constituted by the vertices of type A (for example $A_1$) located at the ends of a major diagonal of a lozenge and also corresponding to the vertices of the icosahedron associated with the Romé de l'Isle polyhedron. It is observed that five pseudo-triangles surround a vertex of type A and the polygon obtained by regrouping is therefore a pentagon.

Consideration is accordingly given to the pseudo-lozenge obtained by joining a pseudo-triangle adjacent to a type-A vertex with an immediately adjacent pseudo-triangle which is contiguous thereto on the side opposite to the initial regrouping center. The end of the major diagonal of the pseudo-lozenge thus obtained corresponds to a new regrouping center (for example $R_1$ in FIG. 3). This regrouping center is in turn surrounded by six pseudo-triangles which therefore form a hexagon. Starting from the regrouping center thus determined, an iterative operation is performed by again starting from the end of the major diagonal of a pseudo-lozenge obtained by joining a pseudo-triangle adjacent to the initial regrouping center with the immediately adjacent pseudo-triangle which is contiguous thereto on the side opposite to the initial regrouping center. For example, with reference to FIG. 3, the regrouping centers $R_2$ and $R_3$ are obtained from the regrouping center $R_1$.

As also illustrated in FIG. 3, the pseudo-triangles are represented by a dashed lines whilst a thick line indicates the polygons and a continuous thin line represents the contour of the initial lozenges.

In FIG. 2, the regrouping centers are indicated by a small circle (o) in the network $M_4$.

It is observed that, irrespective of the degree of subdivision, the center E of the initial lozenge is a regrouping center (for example the center $R_3$ in FIG. 3).

Starting from one end of the major diagonal of a lozenge, it is found that the entire sphere is thus covered with a series of contiguous polygons without any overlap. When preparing a series of maps which utilize the projection of a polygon in each case, this series of maps can be of constant size, thus permitting easy position-finding when changing from one map to another. This property is particularly advantageous in the case of visual display of maps on a cathode-ray screen.

The regrouping operation described in the foregoing constitutes a procedure which will be designated as the principal coverage and makes it possible to cover the entire earth with a series of polygons without overlap. It is also possible to start from a regrouping center formed by a type-B vertex located at the end of a minor diagonal of an initial lozenge. In this case, the starting polygon is a hexagon but the successive determination of regrouping centers in accordance with the method described earlier results in overlapping of the polygons when rotating about a vertex of type A. It is thus possible to construct two secondary coverages each covering the entire surface of the earth but in this case with overlapping of certain portions. The use of a secondary coverage will therefore be preferably reserved for cases in which the map center formed by the principal coverage may not prove satisfactory for the purpose of obtaining a good representation of the region of the earth under consideration.

Conventional stereographic maps with north and south poles form part of the principal coverage in the case of all grid systems. FIG. 5 shows one example of a principal-coverage map centered at ($1=126°$, $L=0$) in the case of the grid network $M_2$. This center is present on all the larger-scale maps of the principal coverage. FIGS. 4 and 6 give examples of maps of a secondary coverage in the case of the grid networks $M_1$ and $M_3$ respectively.

The most complete cartographic objective in the case of a given grid system is to center all maps at the nodes of the network so that each map covers at least the polygon whose origin is a regrouping center (in either principal or secondary coverage). The projective system thus obtained constitutes what is known as ternary cartography in which each triangle is represented three times. This is a redundant solution to the cartographic problem but may usefully be contemplated, first of all because it constitutes for a given problem a choice of realizable maps which is already very selective, secondly because the excessive cost of this complete solution will gradually cease from being prohibitive (additional redundancy in regard to documents presented by visual display does not need to be provided in cartographic data banks), and lastly because it constitutes an advantageous concept while offering interesting possibilities in continuous display technologies.

In practice, preference is given to stereographic projection as a type of representation associated with the grid system described in the case of a sphere in view of the fact that it is the best conformal representation in a circular field and that moderation in the variation of its scale factor permits representation in the same format of the 32 maps related to the grid network $M_1$ (twelve principal-coverage maps, twenty secondary-coverage maps) at a scale $E_1$, the 122 maps related to the network $M_2$ (forty-two principal-coverage maps including two polar charts and ten equatorial charts, and eighty secondary-coverage maps) at the scale $2E_1$; the 482 maps related to the network $M_3$ at the scale $4E_1$, and so on. The series of projective systems thus mentioned is in principle indefinite in the vicinity of large scales and is completed in the vicinity of small scales (at the scale $E1/2$ by twelve maps centered at the vertices of the icosahedron and each covering (in the same format) the spherical pentagon whose origin is at the center of the map and whose five vertices are the adjacent vertices of the icosahedron. The corresponding grid network can be designated as $M_o$.

Properties which have been little recognized up to the present time may be mentioned in favor of this projection. These properties permit precise and rapid computations of a number of different elements: distance and azimuths between points from projection coordinates, segmentation of a great-circle line into proportional parts, and finally the fact that this projection is the component in the horizontal plane of a simple three-dimensional transformation (inversion) and that this property endows the projection with advantageous possibilities in the field of geodesy, especially in three-dimensional representation of the local gravitational field.

Apart from the polystereographic system, the circular field of each map is also conducive to the need for polycentric representations of the radial type, in particular the gnomonic projection, azimuthal projection, cylindrical projection, radial equivalent projection, perspective projection from a satellite. These representations can in particular perform a useful function in cathode-ray screen display and can be calculated on request on the basis of the stereographic projection having the same center.

The gnomonic projection, which has the well-known property of representing great-circle arcs along segments of straight lines, is often favorable but exhibits unacceptable scale distortions in low-index grid networks ($M_0$, $M_1$, $M_2$) in cases in which stereographic representation always remains very suitable for use.

As will readily be understood, the invention is not limited to the embodiments described in the foregoing and any alternative forms of construction may accordingly be contemplated.

In particular, it seems useful to draw attention to the triple function which the grid system is capable of performing in a map representation. Thus a network $n_1$ permits specific definition of the map centered at one point of this network and provided in a practical format (circular, square or rectangular) and incorporating at least the polygon which is associated with this point. An index $n_2 > n_1$ corresponds to a finer subdivision which is effectively materialized and is intended to facilitate plotting in the same manner as geographic coordinates. Finally, it is possible to contemplate an index $n_3 > n_2$ of the network which will not be apparent but will serve as a framework for a much finer division, thus forming a triangle-base or quadrangle-base grid-system map which is wholly analogous to conventional grid maps (having a square, rectangle or triangle base), thus making it possible to produce original cartographic documents having a unified structure over the entire surface of the earth or globe.

Furthermore, although consideration has been given more particularly to the construction of maps by stereographic or radial projection by reason of the advantages which they provide, a map can be constructed with a different projection and can carry a sphere grid network in accordance with the invention. This network can also be superimposed on another network such as, for example, the grid system of meridians and parallels as illustrated in thin lines in FIGS. 4, 5 and 6.

Moreover, although the number NL of subdivisions of the sides of the fundamental lozenge is in principle a power of 2, the method may be extended without any difficulty to a different value of NL such as a power of 10, for example. This decision may be taken in particular with a view to ensuring conformity of the grid system with map scales which extend in principle in accordance with the rule 10, 5, 2.5, 1, 0.5, and so on. One property of the system lies precisely in its ease of adaptation to breakdown of different types other than division into binary powers although this latter remains preferable.

Finally, it is possible to accept diversity of orientation of the cartographic document. In this case, regrouping of triangles need no longer be performed and will be replaced by a cartographic unit of the quadrangle type (or pseudo-lozenge type) both in the total representation of the basic lozenge (NL=1) at a scale $E_1$ and in the representations of binary sub-multiples of this lozenge at the scales $2E_1$, $4E_1$... $2^{n-1}E_1$ (defined by $NL=2.4$ ... $2^{n-1}$). The complete assembly results in a cartographic series having a useful format which closely resembles a lozenge and can be inscribed within a constant rectangular format.

In this context, it is possible to define a projection of a novel type which is the same (subject to a different scale) for any basic lozenge and its derived quadrangles for which the plane image of the useful quadrangle will be a lozenge having standardized dimensions. To this end, it is observed that, if the coordinates (X, Y) of the projection are associated with the variables (T, t) by a linear relation, an equivalent map of the mapped field is thus defined (to within a maximum approximation of 0.005) as long as it remains within the same basic lozenge.

The following simple solution $$X = dt; \quad Y = dT \quad (d \text{ real} > 0)$$

transforms the quadrangles into squares but at the cost of substantial angular deformation.

The preferred solution is as follows:

$$X = 0.18448 \, d_1 \, (t - T)$$

$$Y = 0.28408 \, d_2 \, (t + T) \quad (19)$$

with $d_1 = d_2 = $ constant (determined by the map format).

The spherical lozenge becomes a true flat lozenge for which the scale of areas is constant (to within a maximum approximation of 0.005) and the linear scale varies in accordance with the extreme ratio of 1.12.

The derived quadrangles (taking into account the scale coefficients $E_n$ to be applied) have the same flat lozenge as an image.

The projection under consideration makes it possible to form partial assemblies of thirty basic lozenges. Thus one lozenge can be associated with the eight adjacent lozenges so as to leave an angular gap of 18° around a point of type B and an angular gap of 30° around a point of type A.

A suitable choice of the factor $d_1/d_2$ permits assemblies which extend over greater distances by removing one of the two gaps mentioned in the foregoing.

A particularly attractive solution consists in adopting the following formulae:

$$X = d \, (t - T)$$

$$Y = d\sqrt{3}(t + T) \quad (d \text{ real} > 0) \quad (20)$$

in which the lozenges are each formed of two equilateral triangles.

The gaps around the twenty points of type B disappear and the gaps around the twelve points of type A are equal to 60°, thus permitting repetitive insertion of predetermined lozenges. This accordingly results in representations of the entire sphere which are regionally equivalent, which have only slight linear deformation (extreme ratio of 1.26), and in which it is only necessary to take into account a certain redundancy of representation as well as the existence of lines of discontinuity.

The equivalent lozenge maps may also be employed in area assessment operations or in map information transfers from one data base to another. In operations of this type, full standardization of the useful format can offer appreciable advantages.

Although the invention has been described particularly in connection with a flat map representation of the earth based on the assumption of a spherical shape, it will be understood that the invention permits extensions which vary over a broad range from a number of different standpoints.

The grid system can be transferred to non-flat map constructions and especially globes which in fact provide (subject to a difference in constant scale factor) an accurate reproduction of the area to be represented and of the external or internal space.

The grid network of the sphere constitutes a work basis for subdividing the space aforesaid. Thus by applying on this grid system radial lines extending from the center of the sphere, it is possible to produce a partition of the solid angle $4\pi$, the vertex of which is located at the center of this sphere. This method can be concurrent with the analogous use of meridians and parallels and can have evident legal implications.

Transition from the sphere to the terrestrial ellipsoid can be solved simply as follows: a preliminary operation consists in deriving a gnomonic or central projection from the ellipsoid on a concentric sphere of radius R (which will preferably be the equatorial radius $R = 6,378,137^m$). This representation is in fact indistinguishable graphically from a conformal representation (the maximum difference between the two types of projection represents $16^m$ at a latitude of 60°). On this image sphere will be applied the spherical grid network and the polycentric charts which have been described in the case of the sphere as a whole.

In order to include the ellipsoid chart in the main description, two corrections accordingly have to be made. In the first place, the latitudes L must be considered as geocentric. Secondly, the areas measured on the image sphere must be multiplied by a factor F (the lengths must be multiplied by the factor $\sqrt{F}$):

$$F = 1 - 0.006717 \sin^2 L + 0.000022 \sin^4 L$$

The choice of the geocentric latitude appears to be optimum since it arises in the majority of formulations relating to positions in space and expressions relating to the gravitational field. Consideration may be given, however, to other projections which permit transfer from the ellipsoid to the sphere, one example being a strictly conformal representation (which would slightly modify the expression of F) or an equivalent projection (in this case $F = 0.997766$). In some instances, the preserved-normal representation (L = geographic latitude in the usual sense of the term) can also prove useful.

In the case of regional representations in the vicinity of a given point $(L_o, l_o)$, it is possible to contemplate conformal representations of the ellipsoid on the sphere along the parallel $L_o$ followed by a polycentric flat representation of the sphere. This type of representation is of undoubted value but does not call for creation of new maps where the polystereographic system is concerned since any map of the sphere having a radius R (on the assumption of a preliminary gnomonic or conformal representation of the ellipsoid on said sphere) may also be considered as a regional map (subject to a difference in north-south translation and in homothetic correspondence) and may therefore be employed in accordance with both aspects.

The considerations developed in connection with the terrestrial ellipsoid are generally applicable to the cartographic description of an object which closely resembles a sphere.

The field of application of the invention accordingly extends to map representation of such objects and includes in particular the construction of an astral map or of a planet chart.

There has been mentioned by way of example a possible arrangement of the twelve vertices of the icosahedron around the globe at positions which correspond practically to centers of well-individualized geophysical areas. As will naturally be understood, consideration could also be given to other alternatives and in particular to the possibility which consists in applying to the preceding solution a rotation of 36° about the axis of the poles. This so-called rotational shift has the effect of placing the non-polar vertices in an ocean area except in the case of two regions (Sahara l=0°, L=26°. 5651; India: l=72°, L=26°. 5651).

The arrangement just mentioned appears to be more favorable than the first solution if map constructions are made to extend from lozenge charts. Accordingly, maps which are formed of two equilateral triangles in each case prove to be the most effective (formula 20). It is even possible to construct in this manner an original planisphere inscribed within a rectangle (having a ratio of sides $\sqrt{27}/10$) in which the temperate regions are shown twice and the polar regions are shown three times. In this case, however, the vertices of the icosahedron behave as singular points and should preferably be placed in zones of secondary cartographic importance whenever it is possible to do so.

Figure 7:
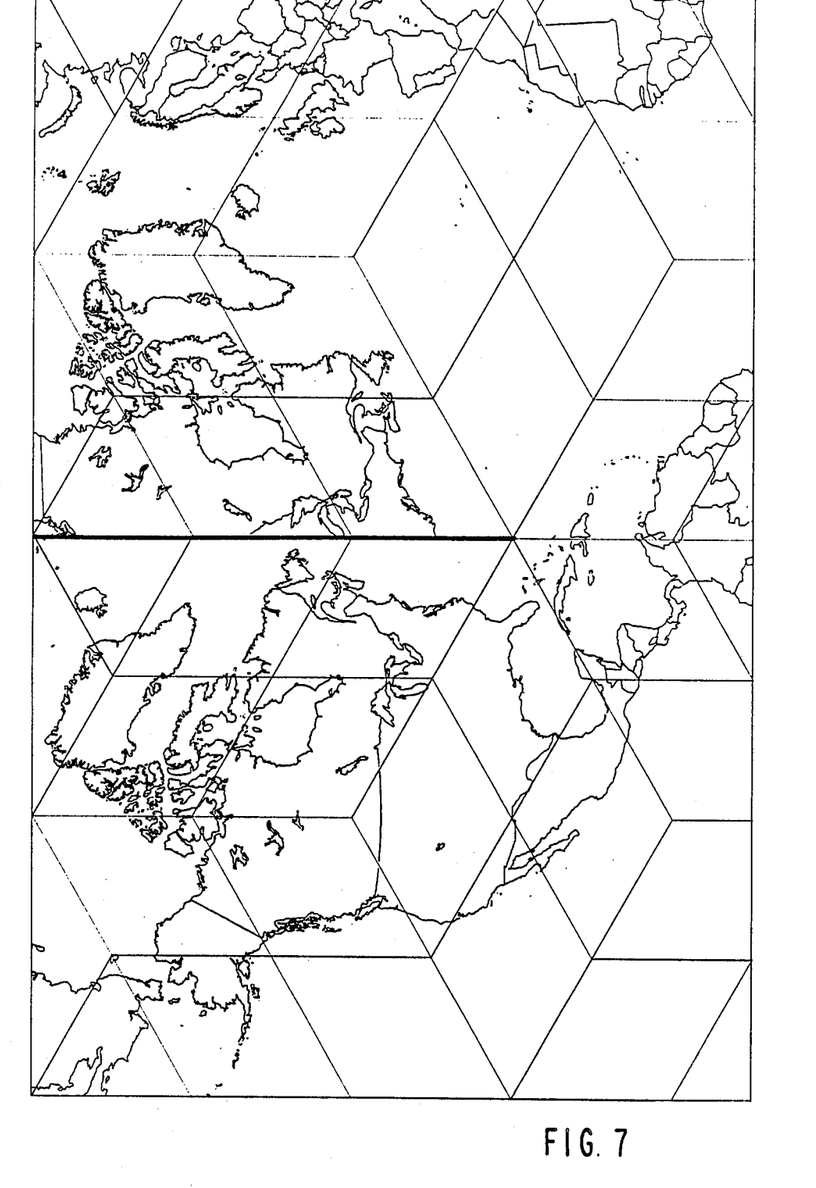
FIG. 7 shows another example of construction of a map in accordance with the invention.

FIG. 7 is an example of association of lozenge charts and shows the fraction of 1/5 of the planisphere which provides a good representation of two important geographic zones: North America and the North Atlantic, the eastern seaboard of North America being repeated by rotation through an angle of 60° about the vertex of the icosahedron (l=72°, L=26°. 5651) and the meridian arc which joins this point to the north pole is a line of discontinuity of the representation.

The planisphere simply materializes the triangular grid system of the sphere which is again presented in the form of a planar network of equilateral triangles and may therefore be conveniently employed as a statistical or thematic map.

Apart from the advantage offered in regard to global representation of the earth's surface, the rotational shift solution provides stereographic maps which are on an average just as good as those of the original solution. Maps centered at the poles and at the equator are the same in the case of both solutions (except for the grid network), one example of a map of this type being illustrated in FIG. 6.

What is claimed is:

1. A geographic map provided with a sphere grid network, wherein said network is obtained by inverse gnomonic transfer of a Romé de l'Isle polyhedron (P) circumscribed about a sphere (S) in accordance with local transfers centered at the point of tangency (E) of each lozenge-shaped face (L) of the polyhedron (P) to the sphere (S).

2. A geographic map according to claim 1, wherein each lozenge ($M_1$) is subdivided into elementary quadrilaterals ($M_2$, $M_3$, ... ) by iterative dichotomy of each side by straight lines ($l_k l_k$, $q_j q_j$) parallel to the adjacent sides.

3. A geographic map according to claim 1, wherein each lozenge is subdivided into elementary quadrilaterals, the vertices of which are defined by straight lines, the intersections ($l_k$, $q_j$) of said straight lines with the sides of the lozenge being determined by the following formulae:

$$a_2 l_k = 1 - g(-T) \quad (1)$$

$$b_2 l_k = g(T) \quad (2)$$

$$a_2 q_j = 1 - g(-t) \quad (3)$$

$$b_1 q_j = g(t) \quad (4)$$

where
$a_2$ is a vertex at one end of the major diagonal of the lozenge ($M_1$);
$b_1$ and $b_2$ are the vertices at the ends of the minor diagonal of the lozenge;

$$g(T)=0.5+T+(T^2-0.25)(v_0+v_1T+v_2T^2+v_3T^3) \quad (5)$$

$$g(t)=0.5+t+(t^2-0.25)(v_0+v_1t+v_2t^2+v_3t^3) \quad (6)$$

$v_0 = 0.07215444$
$v_1 = 0.229157$
$v_2 = 0.026875$
$v_3 = 0.080845$
T being of the form $T = k/NL - 0.5$
t being of the form $t = j/NL - 0.5$
where
NL is the whole number of subdivisions required for one side and
j and k are whole numbers varying from 1 to NL;
$a_2 l_k$, $b_2 l_k$, $a_2 q_j$, $b_1 q_j$ being the fractions of the length of side of the lozenge transferred to the sides of the lozenge respectively from the vertices $a_2$, $b_2$, $a_2$, $b_1$.

4. A geographic map according to claim 1, wherein each lozenge is subdivided into elementary quadrilaterals having vertices defined by straight lines in which the intersections ($l_k$, $q_j$) with the sides of the lozenge are determined by the following formulae:

$$a_2 l_k = 1 - h(-T,t)$$

$$b_2 l_k = h(T,t)$$

$$a_2 q_j = 1 - h(-t, T)$$

$$b_1 q_j = h(t, T)$$

where
$a_2$ is a vertex at one end of the major diagonal of the lozenge;
$b_1$ and $b_2$ are the vertices at the ends of the minor diagonal of the lozenge;

$$h(T,t)=0.5+T+(T^2-0.25)(v_0+v_1T+v_2T^2+v_3T^3)+uT(T^2-0.25)(t^2-0.25) \quad (7)$$

$$h(t,T)=0.5+t+(t^2-0.25)(v_0+v_1t+v_2t^2+v_3t^3)+ut(T^2-0.25)(t^2-0.25) \quad (8)$$

$v_0 = 0.07215444$
$v_1 = 0.222360$
$v_2 = 0.026089$
$v_3 = 0.085626$
$u = -0.049765$
T being of the form $T = k/NL = -0.5$
t being of the form $t = j/NL - 0.5$
where
NL is the whole number of subdivisions required for one side and
j and k are whole numbers varying from 1 to NL;

$a_2 l_k$, $b_2 l_k$, $a_2 q_j$, $b_1 q_j$ being the fractions of the length of side of the lozenge transferred to the sides of the lozenge respectively from the vertices $a_2$, $b_2$, $a_2$, $b_1$.

5. A geographic map according to claim 3, wherein graduations having a value T and t or equivalent identification codes are marked on the sides of the lozenge at the points of intersection ($l_k$, $q_j$) of the subdivision lines with the sides and said graduations extend from $-0.5$ at the minor-diagonal vertices of the lozenge to $+0.5$ at the major-diagonal vertices of the lozenge.

6. A geographic map according to claim 1, wherein each elementary quadrilateral is re-cut into pseudo-triangles by arcs which are substantially parallel to the minor diagonal of the lozenge and pass through the vertices of the elementary quadrilaterals.

7. A geographic map according to claim 6, wherein the map grid system is obtained from the sphere network by means of a projection of part of said network.

8. A geographic map according to claim 7, wherein said map is centered at one of the points of the network and covers at least the polygon formed by the pseudo-triangles in which the point aforesaid is one of the vertices.

9. A geographic map according to claim 8, wherein said map is centered at a principal regrouping center of the sphere network, said regrouping center being one of the major-diagonal vertices of a spherical lozenge transferred to the sphere from a Romé de l'Isle polyhedron or one of the vertices of a pseudo-lozenge determined by iterative displacement on the sphere starting from an initial regrouping center along a major diagonal of a pseudo-lozenge obtained by joining a pseudo-triangle adjacent to the initial regrouping center to the immediately adjacent pseudo-triangle which is contiguous thereto on the side opposite to said initial regrouping center.

10. A geographic map according to claim 7, wherein the projection is a radial projection centered at one point of the grid network.

11. A geographic map according to claim 10, wherein the projection is a stereographic projection.

12. A geographic map provided with a network derived from the geographic map according to claim 3, wherein said map is provided with rectangular coordinates linearly related to the parameters T, t.

13. A geographic map according to claim 7 and applicable to a surface approximating to a sphere, wherein said map describes the spherical image obtained by means of a preliminary representation of said surface on the sphere, especially by means of an equivalent or conformal central projection.

* * * * *